United States Patent
Yen et al.

(10) Patent No.: US 11,699,438 B2
(45) Date of Patent: Jul. 11, 2023

(54) OPEN SMART SPEAKER

(71) Applicant: devicebook Inc., Bellevue, WA (US)

(72) Inventors: Wei Yen, Bellevue, WA (US);
Raymond Lo, Bellevue, WA (US);
Fumiaki Okushi, Bellevue, WA (US);
Sourabh Ladha, Bellevue, WA (US);
John Masin, Bellevue, WA (US);
Wingshun Ho, Bellevue, WA (US)

(73) Assignee: devicebook Inc., Bellevue, WA (US)

( * ) Notice: Subject to any disclaimer, the term of this patent is extended or adjusted under 35 U.S.C. 154(b) by 41 days.

(21) Appl. No.: 17/067,581

(22) Filed: Oct. 9, 2020

(65) Prior Publication Data
US 2021/0304750 A1  Sep. 30, 2021

Related U.S. Application Data

(60) Provisional application No. 62/914,285, filed on Oct. 11, 2019.

(51) Int. Cl.
*G10L 15/22* (2006.01)
*G10L 15/26* (2006.01)
*G06F 3/16* (2006.01)

(52) U.S. Cl.
CPC .............. *G10L 15/22* (2013.01); *G06F 3/167* (2013.01); *G10L 15/26* (2013.01); *G10L 2015/223* (2013.01)

(58) Field of Classification Search
CPC ................................. G10L 15/22; G10L 15/26
See application file for complete search history.

(56) References Cited

U.S. PATENT DOCUMENTS

| | | | | |
|---|---|---|---|---|
| 9,472,192 B2* | 10/2016 | Ding | ........................ | G10L 15/30 |
| 2015/0012278 A1* | 1/2015 | Metcalf | .............. | G06Q 30/0201 |
| | | | | 704/270.1 |
| 2017/0213559 A1* | 7/2017 | Agrawal | ................. | G10L 15/22 |

* cited by examiner

*Primary Examiner* — Ibrahim Siddo
(74) *Attorney, Agent, or Firm* — Nixon & Vanderhye P.C.

(57) ABSTRACT

Methods to build an open smart speaker to orchestrate voice services from multiple providers, and open smart speakers that orchestrate voice services from multiple providers.

15 Claims, 4 Drawing Sheets

| |
|---|
| Name of the voice service |
| Reserved phrase |
| Optional universal sound pattern(s) of the reserved phrase |
| Optional rejected sound pattern(s) |
| Optional specification of identification |
| Specification of credential |
| A method to enroll into a voice service |
| Specification of voice input format(s) |
| Specification of voice response output format(s) |
| A method to invoke service APIs |
| An optional method to receive events sent from the voice services |

FIG. 3B

OPEN SMART SPEAKER

CROSS-REFERENCES TO RELATED APPLICATIONS

This application claims priority from U.S. provisional application No. 62/914,285 filed Oct. 11, 2019.

FIELD

This technology relates to an open smart speaker voice service device that can selectively communicate with any of multiple service providers.

BACKGROUND & SUMMARY

As of today, smart speakers (voice services) are in silos, i.e., one brand of smart speaker works only with its dedicated assigned voice service provider. This is going to change, as users invariably will need services from multiple providers.

The following provides methods to build an open smart speaker to orchestrate voice services from multiple providers.

An aspect provides for the use of a list (more than one) of reserved-phrases, not just one, in the Device.

Another aspect provides for the use of a list of reserved-phrases in the Device, which includes a device Cloud.

Another aspect provides for the use of a list of reserved-phrases with corresponding Voice Service Registry in the Device.

Another aspect provides for the use of a list of reserved-phrases with corresponding Voice Service Registry in the Device, which includes a device Cloud.

BRIEF DESCRIPTION OF THE DRAWINGS

FIGS. 3A and 3B show example non-limiting voice service provider data structures.

DETAILED DESCRIPTION OF EXAMPLE NON-LIMITING EMBODIMENTS

The Device

Figures 1A, 1B:
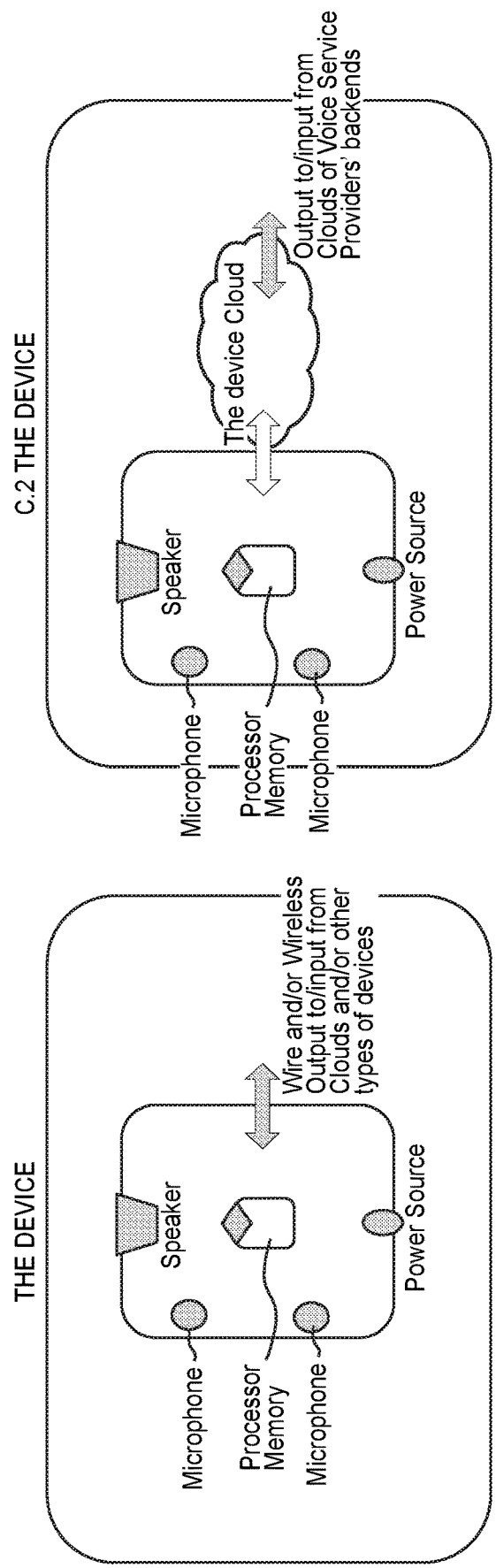
FIGS. 1A and 1B are schematic diagrams of a smart speaker device interacting with different cloud-based voice service providers.

As shown in FIG. 1A, an open smart speaker is a device that employs microphone(s), speaker(s), one or more processors of some kind, and runs a piece of software code or microcode in EPROM/EEPROM, RAM, SRAM, or some type of memory storage. It's a limited-function input/output device. Whenever the device is turned on, it starts listening to the surrounding sound.

Besides other functions, if and when a user wants to receive a service from a voice service provider, it requires the user to precede a voice command with a reserved phrase, where the reserved phrase identifies which service provider to process the voice command. The smart speaker functions as a voice service frontend ("frontend"). The frontend captures sound signals and then delivers to the appropriate voice service provider's service at the backend ("backend") (which is most likely, but not limited to, in the Cloud) to process. Responses from the voice services backend will then output through the smart speaker.

The above technique is different from prior art techniques. For example, it is common for a user to say "Hey Siri, time 5 minutes" to their Apple iPhone or "Alexa, play my favorite song" to their Amazon Echo. The first word "Siri" or "Alexa" alerts their smart speaker device to wake and decode subsequent words as a command or request. In such cases, the device will typically recognize only one predetermined utterance (although it may occasionally confuse different "sound alike" utterances for the predetermined one). And the device always uses the same back end voice service provider.

In some prior art cases, it may be possible to change the default wake word to something else. For example, the Amazon Echo can be reprogrammed to change "Alexa" to "Computer", "Amazon" or "Echo." If reprogrammed to "Computer", the Amazon Echo will no longer respond to "Alexa". But no matter what default wake word the Amazon Echo is programmed for, once it wakes and begins recording speech, it will always contact the Amazon backend voice service provider. No wake word will cause the Amazon Echo to contact a different back end voice service provider.

If one were to place an Apple iPhone and an Amazon Echo side by side and begin speaking, the Apple iPhone would recognize only "Siri" and ignore other wake utterances such as "Alexa", and the Amazon Echo would recognize only "Alexa" and ignore other wake utterances such as "Siri". Whenever the Apple iPhone wakes, it records speech and uses the Apple backend voice service provider. Whenever the Amazon Echo wakes, it records speed and uses the Amazon backend voice service provider. The Apple iPhone never uses the Amazon backend, and the Amazon Echo never uses the Apple backend. To use different backends and associated service providers using such prior art speaker devices, you need two different smart speaker devices.

In contrast, present non-limiting device examples could recognize both "Siri" and "Alexa" and send commands uttered following "Siri" to a first voice service provider and send commands uttered following "Alexa" to a second, different voice service provider.

It is an open design in the sense that it is agnostic to most except the most unusual voice service providers' backends, by virtue of defining a voice service interaction model. By operating in the domain of sound signals (instead of natural language), it comes with little restrictions other than restrictions that are imposed the voice service provider's backend, e.g., it will work with any spoken languages that are supported by the backend.

The open smart speaker operates in the domain of sound signals, captured by a microphone or a microphone array. The sound signals might be optionally enhanced digitally, e.g., using beam-forming or blind-source-separation techniques to improve signal/noise ratio, perform acoustic echo cancellation and de-reverberation, noise suppression, etc. The enhancements typically do not affect the functionality of the open smart speaker, but will affect its accuracy in the presence of noise or when the user is not at close proximity to the smart speaker.

Sound Grammar

The open smart speaker operates in the domain of sound signals. A sound signal is segmented and parsed according to the following grammar, represented in Backus-Naur form (BNF). Each class name in BNF (the name enclosed by < >) is a sound signal segment. Following the grammar, a sound segment is further partitioned into shorter segments, until the segment cannot be partitioned any more.

```
<open-speaker-commands>::=<open-speaker-
   command>|<open-speaker-commands>
<open-speaker-command>::=<reserved-
   phrase><comma><voice-command><full-
   stop>|<reserved-phrase><voice-command><full-stop>
```
where
    <reserved-phrase> is defined to be a configurable set of sound patterns, e.g. sound patterns of OK_GOOGLE or ALEXA.

<comma> is a short sound segment containing no voice activity, typical of a mid-sentence break. Notice that, <comma> could be optional.

<full-stop> is a longer sound segment containing no voice activity, typical of end of sentence.

Figure 2:
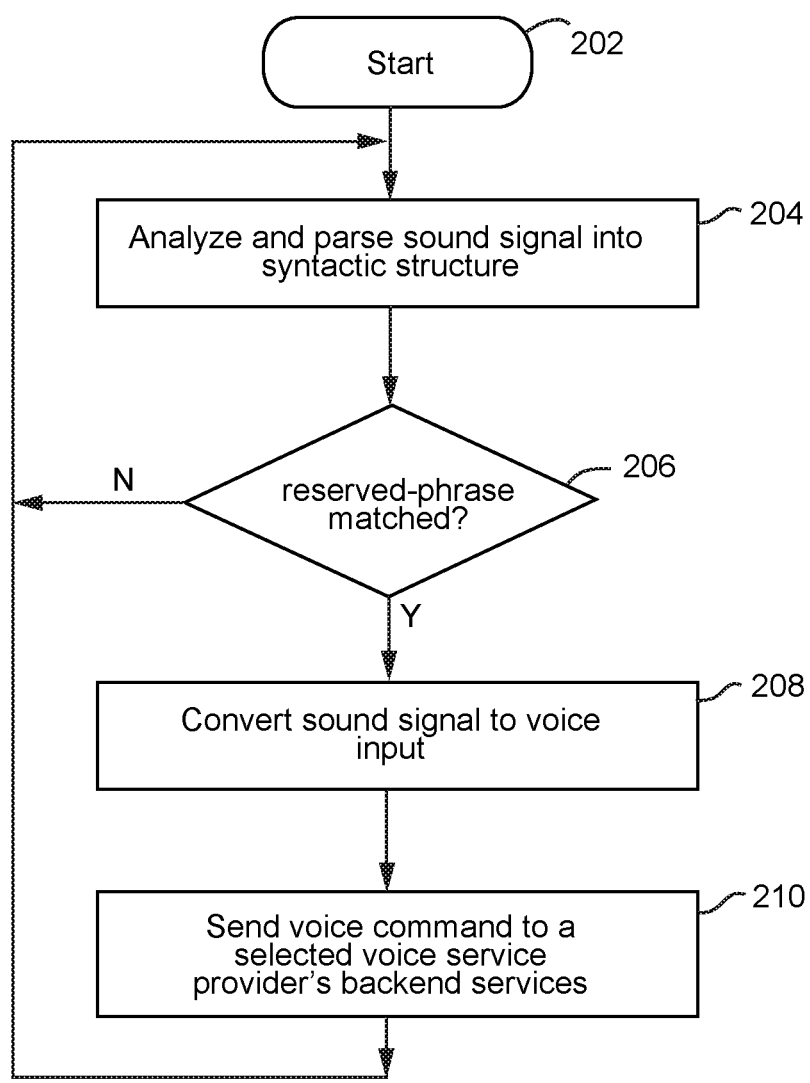
FIG. 2 shows an example flowchart of operations the smart speaker device processor performs.

A. Main Processing Loop (FIG. 2)

1. Analyze and Parse Sound Signal into Syntactic Structure (Block 204)

The processor takes the continuous stream of sound signal and employs one or more sound matching algorithms to compare the sound signal input against a list of sound templates. Sound templates are the sound patterns corresponding to the reserved-phrases. Once a match is identified, the sound processor will match an optional short pause, i.e., <comma>. The sound input following the optional <comma> and ended by <full-stop> is the sound signal constituting the voice command.

2. When a Reserved-Phrase is Matched, Converting Sound Signal to Voice Input (Blocks 206, 208)

Based on the matched reserved-phrase, the voice service provider is identified and how it wants to accept the voice input is instructed by the Voice Service Registry. We use the terminology "sound signal" to refer to the sound captured by smart speaker frontend, and the term "voice input" to refer to the data format expected by the voice service provider's backend. The smart speaker, the frontend, is responsible for the conversion of "sound signal" into "voice input".

Conversion (Block 208)

i. Some voice service provider's backend requires voice input to be a highly preprocessed sound signal, for example, with acoustic echo, reverberation removed, and environmental noise suppressed/minimized. Some voice service provider's backend works better without the preprocessing, but however they require a short duration of the environmental noise preceding the voice input so that the service provider's backend can estimate and eliminate the environment noise by itself.

ii. Some service provider's backend expects the <reserved-phrase> to be sent together with the <voice-command>, and some do not. The service provider's backend requiring <reserved-phrase> typical performs another round of <reserved-phrase> matching with more sophisticated and accurate algorithm, to reduce the chance of false triggering.

iii. Re-sample to sound sample rate expected by the voice service provider's backend iv. Re-encode to the required format, e.g., PCM, Free Lossless Audio Codec (FLAC), and/or in 10 ms chunk of binary data.

2. Send Voice Command to Voice Service Provider's Backend Services (Block 210)

Invoke voice command API and obtain a response, using the method described in the voice service registry, with the credential setup during the enrollment procedure.

If the API response contains a voice response element, output to the on-board loudspeaker.

A. Voice Service Registry

Figure 3A:
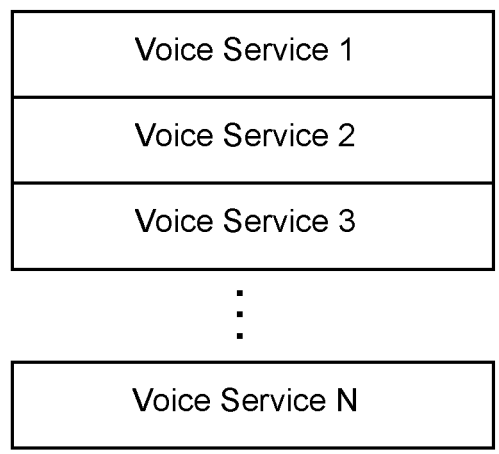

Although the method of invocations and data format vary among voice services, it is possible to build an abstract interaction model so that it becomes possible for one smart speaker to interact with otherwise incompatible voice service backends. The following describes the registry (see FIGS. 3A, 3B—where FIG. 3A shows a data file containing multiple data structures, one for each of plural voice services and FIG. 3B shows one such example data structure), representing the interaction model:

1. Name of the voice service
2. Reserved phrase
3. Optional universal sound pattern(s) of the reserved phrase A universal sound pattern(s) works for everyone. It requires no additional setup, which is a more convenient. But a personalized sound pattern(s) would achieve better accuracy and immunity against noise.

4. Optional rejected sound pattern(s)

For example, because of the similarity between "Alex" and "Alexa", we want to add "Alex" to the suppressed phrase list to prevent incorrect matching.

Another example: if a specific utterance of "OK Google" is used in a TV Commercial, we want to suppress matching of that exact utterance.

5. Optional specification of identification, that might identify the user and/or the device
6. Specification of credential In user-based authentication, the user's credential is used for API calls Alternatively, when the user enrolls a device to the voice service backend, a new set of credentials is granted and bound to the device. Subsequent API calls will use the device's credential.

7. A method to enroll into a voice service i.e., authenticate and save the necessary credential for subsequent API calls 8. Specification of voice input format(s)
9. Specification of voice response output format(s)
10. A method to invoke voice service APIs
11. An optional method to receive events sent from the voice services An Example of enrollment methods in "6", and "7" above: a user enrolls, sometime the user himself and sometimes the device, into one or more of the voice service backends:

1. User selects from one of the available voice service backends
2. User uses a mobile device to register with a voice service, and store a credential and the optional identification information on the open smart speaker. The credential might be the user's credential or another credential returned from the voice service provider.
3. Prompt the users to utter the reserved phrase one or more times. This step might be skipped if the registry provides default sound patterns.
4. Repeat steps 1 to 3 to add next voice service provider's backend.

An example of events in "11" above:

Sometimes a voice service provider's service might ask the user for extra information, e.g., when the user asks to play music, the voice service provider's service lists the available choices, and asks the user to make a selection of what kind of music to play. In this case, the voice service provider's backend sends "events" to request the open smart speaker to play an audio and upload additional input. The "events" are processed by the event handler of the open smart speaker.

C. Simple Variations or Extensions

1. Add Local Command Processing

<open-speaker-commands>::=<local-command>|<open-speaker-command>|<open-speaker-commands> where

<local-command> is a voice command recognized by the device, the voice service frontend.

2. The device, the voice service frontend, consists a device and its own device Cloud ("the device Cloud"). The device here means the device (voice service frontend) consists of a device and a Cloud, where some parts of the voice service frontend processing and functions are done in or through the device Cloud.

The Design Considerations of Voice Service Registry

The design and implementation of a Voice Service Registry can be done in a variety of ways. At one end of the spectrum, it can be designed and implemented as one code body (software or microcode) that uses a database which contains entries of each service provider's Voice Service Registry; or at another end of the spectrum, data of Voice Service Registry is hand coded internally to the software or microcode code itself. Somewhere in between, Voice Service Registry can also be designed and implemented as an array of code body and data (FIG. 3A), where each array entry contains a service provider's corresponding Voice Service Registry entry (FIG. 3B).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A voice service interface device comprising:
   at least one microphone; and
   at least one processor operatively connected to the at least one microphone, the at least one processor configured to use a list of more than one reserved-phrases, not just one reserved phrase, in the Device,
   wherein the at least one processor is configured to use the list of reserved-phrases with corresponding Voice Service Registry in the Device,
   wherein the processor is further configured to use the Voice Service Registry in the Device to select a voice API to invoke depending on a voice service provider corresponding to the reserved phrase.

2. The voice service interface device of claim 1 wherein the corresponding Voice Service Registry in the Device includes a device Cloud.

3. A voice service interface device comprising:
   at least one microphone;
   at least one memory storing plural reserved phrases and associated voice service interface information; and
   at least one processor operatively connected to the at least one microphone and the at least one memory, the at least one processor configured to:
   decode speech picked up by the microphone,
   determine whether decoded speech corresponds to one of the stored reserved phrases; and
   if the decoded speech corresponds to one of the stored reserved phrases, selecting between plural voice services to use the voice service associated with the one stored reserved phrase and initiating interaction with the selected voice service based on the voice service interface information associated with the selected voice service,
   wherein the at least one processor is configured to use a list of reserved phrases with corresponding Voice Service Registry in the Device,
   wherein the processor is further configured to use the Voice Service Registry in the Device to select a voice API to invoke depending on a voice service provider corresponding to the reserved phrase.

4. The voice service interface device of claim 3 wherein the interaction comprises sending information into the cloud.

5. The voice service interface device of claim 4 wherein the sent information comprises speech uttered after utterance of the reserved phrase.

6. The voice service interface device of claim 3 wherein the at least one processor is further configured to automatically enroll in a cloud based voice service.

7. A voice service interface device comprising:
   at least one microphone;
   at least one memory storing plural reserved phrases and associated voice service interface information; and
   at least one processor operatively connected to the at least one microphone and the at least one memory, the at least one processor configured to:
   decode speech picked up by the microphone,
   determine whether decoded speech corresponds to one of the stored reserved phrases; and
   if the decoded speech corresponds to one of the stored reserved phrases, selecting between plural voice services to use the voice service associated with the one stored reserved phrase and initiating interaction with the selected voice service based on the voice service interface information associated with the selected voice service,
   wherein the at least one memory stores, for each of plural voice services:
   Name of the voice service,
   Reserved phrase,
   Optional universal sound pattern(s) of the reserved phrase,
   Optional rejected sound pattern(s),
   Optional specification of identification, that might identify the user and/or the device,
   Specification of credential,
   a method to enroll into a voice service,
   Specification of voice input format(s),
   Specification of voice response output format(s),
   A method to invoke voice service APIs,
   An optional method to receive events sent from the voice services.

8. A voice service interface device comprising:
   at least one microphone;
   at least one memory storing:
   a first reserved phrase and associated first voice service interface information, and
   a second reserved phrase and associated second voice service interface information, and
   at least one processor operatively connected to the at least one microphone and the at least one memory, the at least one processor configured to:
   decode speech picked up by the microphone,
   determine whether decoded speech corresponds to the first stored reserved phrases;
   if the decoded speech corresponds to the stored first reserved phrase, initiating interaction with a first voice service in response to the associated first voice service interface information; and if the decoded speech corresponds to the stored second reserved phrase, initiating interaction with a second voice service in response to the associated second voice service interface information, wherein the at least one processor is configured to use the list of reserved-phrases with corresponding Voice Service Registry in the Device, wherein the processor is further configured to use the Voice Service Registry in the Device to select a voice API to invoke depending on a voice service provider corresponding to the reserved phrase.

9. The voice service interface device of claim 8 wherein the interaction comprises sending information into the cloud.

10. The voice service interface device of claim 9 wherein the information comprises speech uttered after utterance of a reserved phrase.

11. The voice service interface device of claim 8 wherein the at least one processor is further configured to automatically enroll in a cloud based voice service.

12. The voice service interface device of claim 8 further comprising a loudspeaker configured to provide audible voice responses to decoded speech.

13. A voice service interface device comprising:
at least one microphone;
at least one memory storing:
    a first reserved phrase and associated first voice service interface information, and
    a second reserved phrase and associated second voice service interface information, and
at least one processor operatively connected to the at least one microphone and the at least one memory, the at least one processor configured to:
    decode speech picked up by the microphone,
    determine whether decoded speech corresponds to the first stored reserved phrases;
    if the decoded speech corresponds to the stored first reserved phrase, initiating interaction with a first voice service in response to the associated first voice service interface information; and
    if the decoded speech corresponds to the stored second reserved phrase, initiating interaction with a second voice service in response to the associated second voice service interface information,
wherein the at least one memory stores, for each of first and second voice services:
    Name of the voice service,
    Reserved phrase,
    Specification of credential,
    a method to enroll into a voice service,
    Specification of voice input format(s),
    Specification of voice response output format(s), and
    A method to invoke voice service APIs.

14. A voice service interface device comprising:
at least one microphone; and
at least one processor operatively connected to the at least one microphone, the at least one processor configured to use a list of more than one reserved-phrases, not just one reserved phrase, in the Device,
wherein the at least one processor is configured to use the list of more than one reserved-phrases with corresponding Voice Service Registry in the Device,
wherein the processor is further configured to use the Voice Service Registry in the Device to select conversion of an utterance after a reserved-phrase to one of a plurality of different formats depending on a voice service provider corresponding to the reserved-phrase.

15. A voice service interface device comprising:
at least one microphone;
at least one memory storing:
    a first reserved phrase and associated first voice service interface information, and
    a second reserved phrase and associated second voice service interface information, and
at least one processor operatively connected to the at least one microphone and the at least one memory, the at least one processor configured to:
    decode speech picked up by the microphone,
    determine whether decoded speech corresponds to the first stored reserved phrases;
    when the decoded speech corresponds to the stored first reserved phrase, initiating interaction with a first voice service in response to the associated first voice service interface information; and
    when the decoded speech corresponds to the stored second reserved phrase, initiating interaction with a second voice service in response to the associated second voice service interface information,
wherein the at least one processor is configured to use the list of reserved-phrases with corresponding Voice Service Registry in the Device,
wherein the processor is further configured to use the Voice Service Registry in the Device to select conversion of an utterance after a reserved phrase to one of a plurality of different formats depending on a voice service provider corresponding to the reserved phrase.

* * * * *